(12) United States Patent
Covington et al.

(10) Patent No.: US 7,288,933 B2
(45) Date of Patent: Oct. 30, 2007

(54) POSITION DETECTING SYSTEM THAT SELF-MONITORS FOR CONNECTIVITY FAULTS

(75) Inventors: Charles Eric Covington, Colleyville, TX (US); Grant Stewart Puckett, Colleyville, TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 73 days.

(21) Appl. No.: 11/314,163

(22) Filed: Dec. 22, 2005

(65) Prior Publication Data

US 2007/0146942 A1    Jun. 28, 2007

(51) Int. Cl.
G01B 7/14    (2006.01)
G01B 7/00    (2006.01)
G01B 7/30    (2006.01)

(52) U.S. Cl. ............... 324/207.16; 324/207.19; 324/260; 324/207.24; 324/207.25

(58) Field of Classification Search ..............
324/207.15–207.19, 244, 260, 207.24, 207.25;
361/63, 65, 88, 67–68, 93.1, 93.5, 93.6
See application file for complete search history.

(56) References Cited

U.S. PATENT DOCUMENTS

| | | | | |
|---|---|---|---|---|
| 3,859,567 A | * | 1/1975 | Allard | 361/45 |
| 4,731,689 A | * | 3/1988 | Nimmersjo et al. | 361/66 |
| 5,109,675 A | * | 5/1992 | Hwang | 60/660 |
| 2006/0164077 A1 | * | 7/2006 | Mehnert et al. | 324/207.23 |

\* cited by examiner

*Primary Examiner*—Bot LeDynh
(74) *Attorney, Agent, or Firm*—Pillsbury Winthrop Shaw Pittman LLP

(57) ABSTRACT

A system for detecting position that is capable of self-monitoring for connectivity faults. In one embodiment, the system comprises a transformer, an excitation potential source, a bias potential source, and a processor.

13 Claims, 9 Drawing Sheets

POSITION DETECTING SYSTEM THAT SELF-MONITORS FOR CONNECTIVITY FAULTS

FIELD OF THE INVENTION

The invention relates to detecting connectivity faults within transformers.

BACKGROUND OF THE INVENTION

Transformers used as position, or location, sensors are known. Typically, such a transformer provides one or more output potentials that vary with the position of a magnetic member disposed within the transformer. From these outputs, the displacement (rotational and/or linear) of the magnetic member may be determined.

In conventional transformers, connectivity faults (e.g., short circuits, open circuits, etc.) may negatively impact the generation of the output potentials. In some cases, connectivity faults may reduce the accuracy of the determination of the position of the magnetic member, or even effectively eliminate determinations of the position of the magnetic member all together. In such instances, the overall functionality a system that implements such a transformer (e.g., a control system, etc.) to detect linear and/or rotational displacement may be significantly impaired.

Consequently, in conventional systems, two or more transformers are used in parallel to verify the output potentials and detect connectivity faults in one of the transformers based on differences in output potentials between the transformers. However, this solution requires the system to include space and processing capabilities for the additional transformer(s). The inclusion of multiple transformers also increases the cost and complexity of the system.

SUMMARY

One aspect of the invention relates to a system for detecting position that is capable of self-monitoring for connectivity faults. In one embodiment, the system comprises a transformer, an excitation potential source, a bias potential source, and a processor. The transformer includes a magnetic member, which is movably disposed therein. The excitation potential source is coupled to the transformer to apply an excitation potential to the transformer, wherein the application of the excitation potential to the transformer induces at least one induced potential that is dependent on the position of the magnetic member within the transformer. The bias potential source is coupled to the transformer to apply a bias potential to the transformer. The processor is coupled to the transformer to receive at least one output signal, the at least one output signal including the at least one induced potential. The processor determines the position of the magnetic member based on the at least one induced potential, and detects connectivity faults within the transformer based on the presence or absence of the bias potential in the output signal.

DETAILED DESCRIPTION

Figure 1:
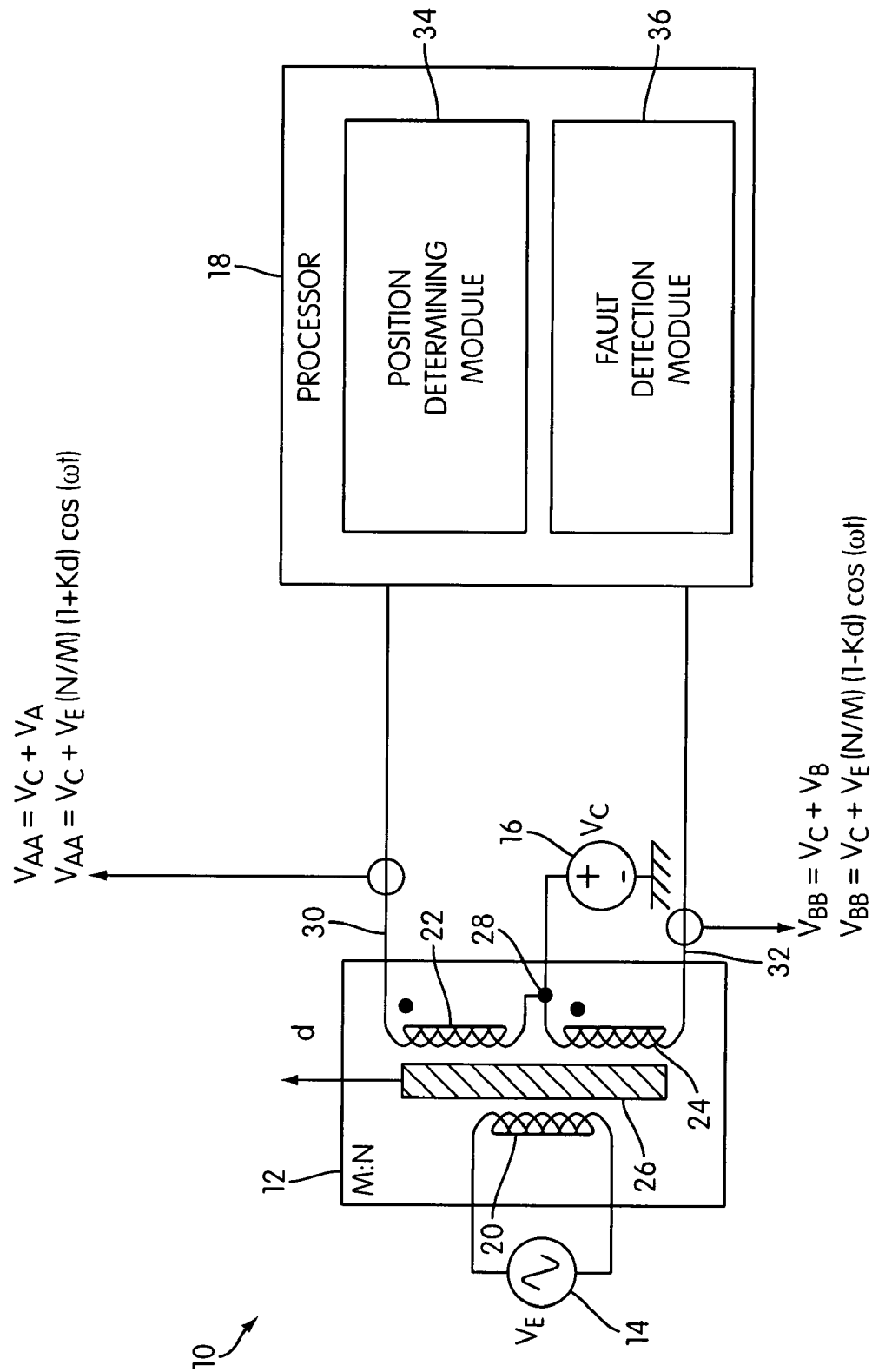
FIG. 1 is a schematic representation of a system for determining a position of a magnetic member, according to one embodiment of the invention.

FIG. 1 is an exemplary illustration of a system 10 for detecting position that is capable of self-monitoring for connectivity faults, according to one embodiment of the invention. System 10 includes a linear variable differential transformer 12, an excitation potential source 14, a bias potential source 16, and a processor 18.

In one embodiment of the invention, transformer 12 includes a primary coil 20, a first secondary coil 22, a second secondary coil 24, and a magnetic member 26. Primary coil 20 is electrically coupled with excitation potential source 14 such that an excitation potential ($V_E$) is applied to primary coil 20 by excitation potential source 14. First and second secondary coils 22 and 24 are located proximate to primary coil 20 such that the application of the excitation potential to primary coil 20 induces a first induced potential ($V_A$) in first secondary coil 22 and a second induced potential ($V_B$) in second secondary coil 24. Magnetic member 26 is slideably disposed between primary coil 20 and secondary coils 22 and 24. A junction 28 electrically couples first secondary coil 22 and secondary coil 24, thereby coupling secondary coils 22 and 24 to each other. In one embodiment, junction 28 is also electrically coupled to bias potential source 16, which applies a bias potential ($V_C$) to junction 28. In other embodiments, junction 28 may be coupled to alternative potential sources/sinks, as will be described below. In the embodiment shown in FIG. 1, a first lead 30 electrically couples first secondary coil 22 to processor 18, and a second lead 32 electrically couples second secondary coil 24 to processor 18. In other embodiments, some of which will be described hereafter (e.g., in FIG. 7), only one of first lead 30 or second lead 32 may be coupled to processor 18. In the embodiment of FIG. 1, first lead 30 transmits an output signal from first secondary coil 22 to processor 18 that has a first output potential ($V_{AA}$). Second lead 32 transmits an output signal from second secondary coil 24 to processor 18 that has a second output potential ($V_{BB}$). Mathematically, first and second output potentials $V_{AA}$ and $V_{BB}$ may be represented as:

$$V_{AA} = V_A + V_C; \text{ and} \quad (1)$$

$$V_{BB} = V_B + V_C. \quad (2)$$

In the embodiment illustrated in FIG. 1, the potentials $V_A$ and $V_B$ induced in each of first secondary coil 22 and second secondary coil 24, respectively, vary based on the position of magnetic member 26. More particularly, in an embodiment like the one shown in FIG. 1, as magnetic member 26 is linearly displaced by a distance d, the potentials $V_A$ and $V_B$ may be described mathematically as follows:

$$V_A(t) = V_E\left(\frac{N}{M}\right)(1 + Kd)\cos(\omega t); \text{ and} \quad (3)$$

$$V_B(t) = V_E\left(\frac{N}{M}\right)(1 - Kd)\cos(\omega t); \quad (4)$$

where N/M represents the voltage ratio between $V_E$ and $V_A$ (or $V_B$), $\omega$ represents the frequency of the excitation potential, K represents a proportionality constant, and t represents time.

As illustrated in FIG. 1, processor 18 includes a position determining module 34 and a fault detection module 36. Although processor 18 is illustrated as a single component in the embodiment of FIG. 1, in other embodiments it may be appreciated that processor 18 may include a plurality of processors connected via an operative link. In some instances, the plurality of processors may be located centrally in a single location. In other instances, one or more of the plurality of processors may be located remotely from each other. The operative link(s) between the plurality of processors may include a communications link, such as a wired, or wireless communications link, and may include a connection established over a network, or via a direct connection. It should further be appreciated that the representation of modules 34 and 36 are provided for illustrative purposes, and that each module may include one or more components that perform the functionalities assigned to modules 34 and 36, as well as other functions. Modules 34 and 36 may include components implemented as hardware, software, firmware, a combination of hardware, software, and/or firmware, as well as in other mediums.

In one embodiment of the invention, position determining module 34 determines the position of magnetic member 26 with respect to secondary coils 22 and 24. Position determining module 34 may leverage a predetermined relationship between the first and second output potentials $V_{AA}$ and $V_{BB}$ (and/or the potentials $V_A$ and $V_B$ that are induced in secondary coils 22 and 24). For example, the following relationship may be used to determine the position of magnetic member 26:

$$Kd = \frac{|V_A| - |V_B|}{|V_A| + |V_B|}; \quad (5)$$

where, again, K is a proportionality constant, and d is a distance that magnetic member 26 has been displaced. This relationship can be expressed in terms of the output potentials $V_{AA}$ and $V_{BB}$ (using eqns. 1 and 2) as follows:

$$Kd = \frac{(V_{AA} - V_{BB})}{(V_{AA} + V_{BB} - 2V_C)}. \quad (6)$$

In one embodiment of the invention, fault detection module 36 is capable of detecting faults (e.g., shorts, opens, etc.) within transformer 12. More particularly, fault detection module 36 is capable of detecting connectivity faults at the electrical connections between excitation potential source 14 and primary coil 20, between first lead 30 and first secondary coil 22, between first secondary coil 22 and junction 28, between junction 28 and bias potential source 16, between junction 28 and second secondary coil 24, and between second lead 32 and secondary coil 24. To detect some of the possible faults within transformer 12, fault detection module 36 monitors the output signals on first lead 30 and second lead 32 to determine if the bias potential is present in each of the output signals. If the bias potential is present in each of the signals, then no faults are present between first lead 30 and second lead 32. If the bias potential is present in the output signal on first lead 30, but is not present in the output signal on second lead 32, then there is a fault between bias potential source 16 and second lead 32. If the bias potential is present in the output signal on second lead 32, but is not present in the output signal on first lead 30, then there is a fault between bias potential source 16 and first lead 30. If the bias potential is not present in either of the output signals, then there is a fault somewhere between first lead 30 and second lead 32. If the bias potential is present in both output signals, but neither output signal includes an induced potential, then there is a fault in the electronic coupling between excitation potential source 14 and primary coil 20.

Figure 2:
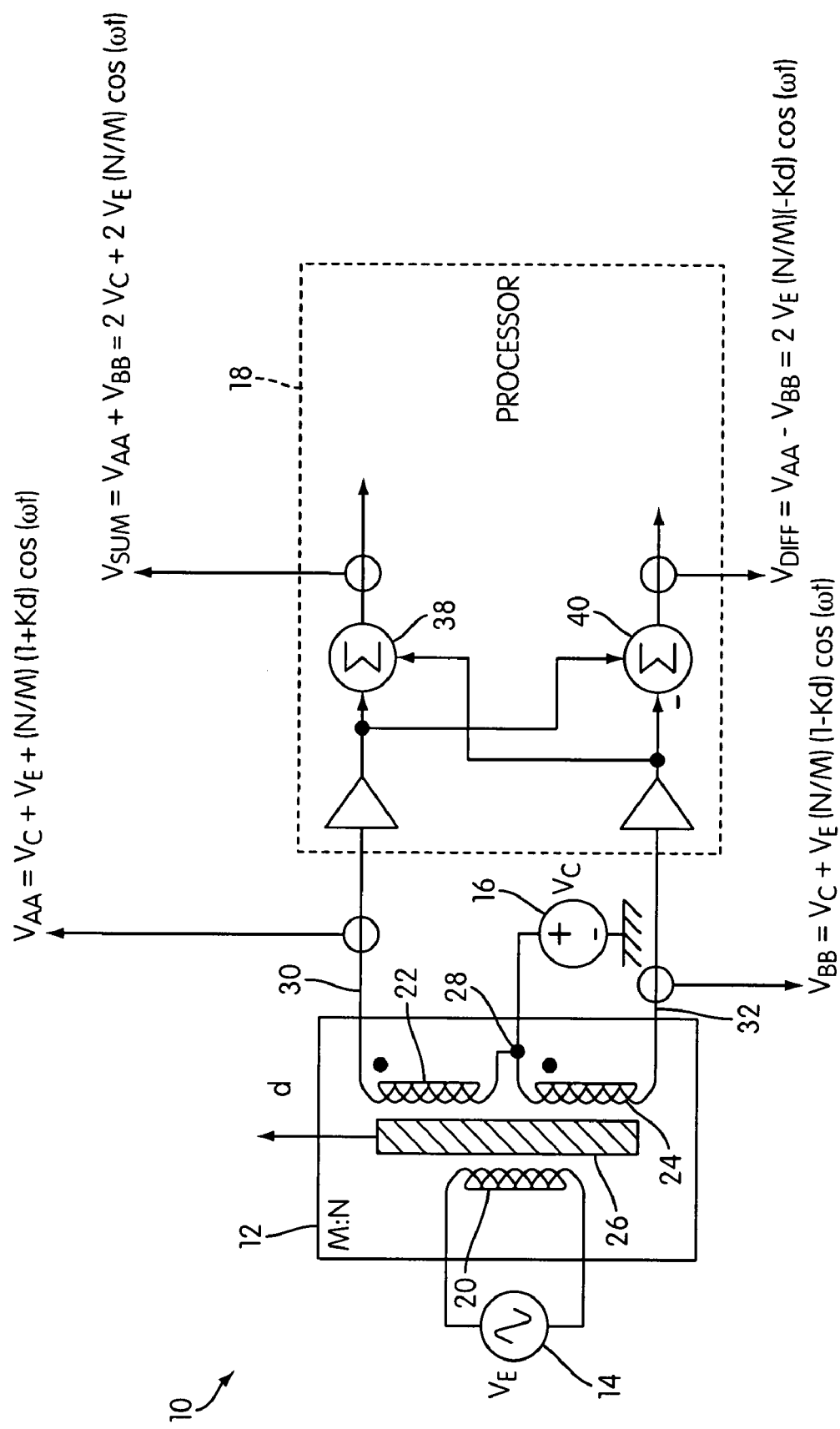
FIG. 2 is a schematic representation of a system for determining a position of a magnetic member, in accordance with one embodiment of the invention.

FIG. 2 is an illustration of system 10 configured according to one embodiment of the invention. In the embodiment of FIG. 2, processor 18 includes an adder circuit 38 and a differencing circuit 40. Each of adder circuit 38 and differencing circuit 40 are electrically coupled to both of first lead 30 and second lead 32. Adder circuit 38 adds the output signals on first lead 30 and second lead 32 such the potential of the signal output from adder circuit 38 is a sum potential ($V_{SUM}$) that includes the sum of the outlet potentials $V_{AA}$ and $V_{BB}$. More particularly $V_{SUM}$ may be represented as follows:

$$V_{SUM}(t) = V_{AA}(t) + V_{BB}(t) = V_A(t) + V_B(t) + 2V_C(t). \quad (7)$$

Differencing circuit 40 subtract the output potential $V_B$ on second lead 32 from the output potential $V_A$ on first lead 30 to generate a signal at a difference potential ($V_{DIFF}$), which may be represented as:

$$V_{DIFF}(t) = V_{AA}(t) - V_{BB}(t) = V_A(t) - V_B(t). \quad (8)$$

Combining the output signals via adder circuit 38 and differencing circuit 40, enables equation 6, which is used by processor 18 to determine the position of magnetic member 26, to be simplified, using the sum potential $V_{SUM}$ and the difference potential $V_{DIFF}$, as:

$$Kd = \frac{V_{DIFF}}{V_{SUM} - 2V_C}. \quad (9)$$

In the embodiments illustrated in FIGS. 1 and 2, excitation potential source 14 is an AC potential source, and bias potential source 16 is a DC potential source. This may enhance various aspects of the system 10, including separating the induced potentials $V_A$ and $V_B$ from the bias potential $V_C$ for the purpose of fault detection. However, in this embodiment, in order to determine the position of magnetic member 26 from the induced potentials $V_A$ and $V_B$, the output potentials, or various combinations thereof (e.g., $V_{SUM}$ and $V_{DIFF}$), some or all of the various potentials may be demodulated before they are used to determine the position of magnetic member 26 and/or to detect faults. Various demodulation techniques, some of which are discussed below, may be executed by processor 18 using software tools, hardware (e.g., circuits), or some combination thereof.

In one embodiment, potentials, such as the output potential, may be multiplied by a potential proportional to, and in phase with, the excitation potential $V_E$. The resulting product yields two potentials, one that is periodic at twice the frequency of the excitation potential $V_E$, and one that is not periodic. The periodic component may then be discarded, and the non-periodic potential may be used for further processing. For illustrative purposes, this demodulation technique is executed below with respect to the induced potential $V_{DIFF}$.

$$V_{DIFF}(t) \cdot V_D(t) = V_E\left(\frac{N}{M}\right)(-2Kd)\cos(\omega t) \cdot D\cos(\omega t); \quad (10)$$

which simplifies to:

$$V_E\left(\frac{N}{M}\right)(-2Kd)\cos(\omega t) \cdot D\cos(\omega t) = \quad (11)$$

$$\left[D \cdot V_E\left(\frac{N}{M}\right)(-2Kd)\right][\cos(\omega t)\cos(\omega t)]$$

$$\left[D \cdot V_E\left(\frac{N}{M}\right)(-2Kd)\right][\cos(\omega t)\cos(\omega t)] = \quad (12)$$

$$\left[D \cdot V_E\left(\frac{N}{M}\right)(-2Kd)\right]\left[\frac{1}{2}(1 + \cos(2\omega t))\right];$$

where the potential ($V_D$) that the induced potential $V_{DIFF}$ is multiplied by is expressed mathematically as:

$$V_D(t) = D\cos(\omega t); \quad (13)$$

where D is an amplitude of the potential $V_D$, and ω is the frequency of the excitation potential $V_E$.

In one embodiment, the potentials are demodulated via synchronous sampling. More particularly, the signals containing the potentials of interest are sampled when cos(ωt) =1. This would enable the amplitudes of the potentials to be used for calculations and determinations without having to perform further processing to demodulate the sampled potentials.

Figure 3:
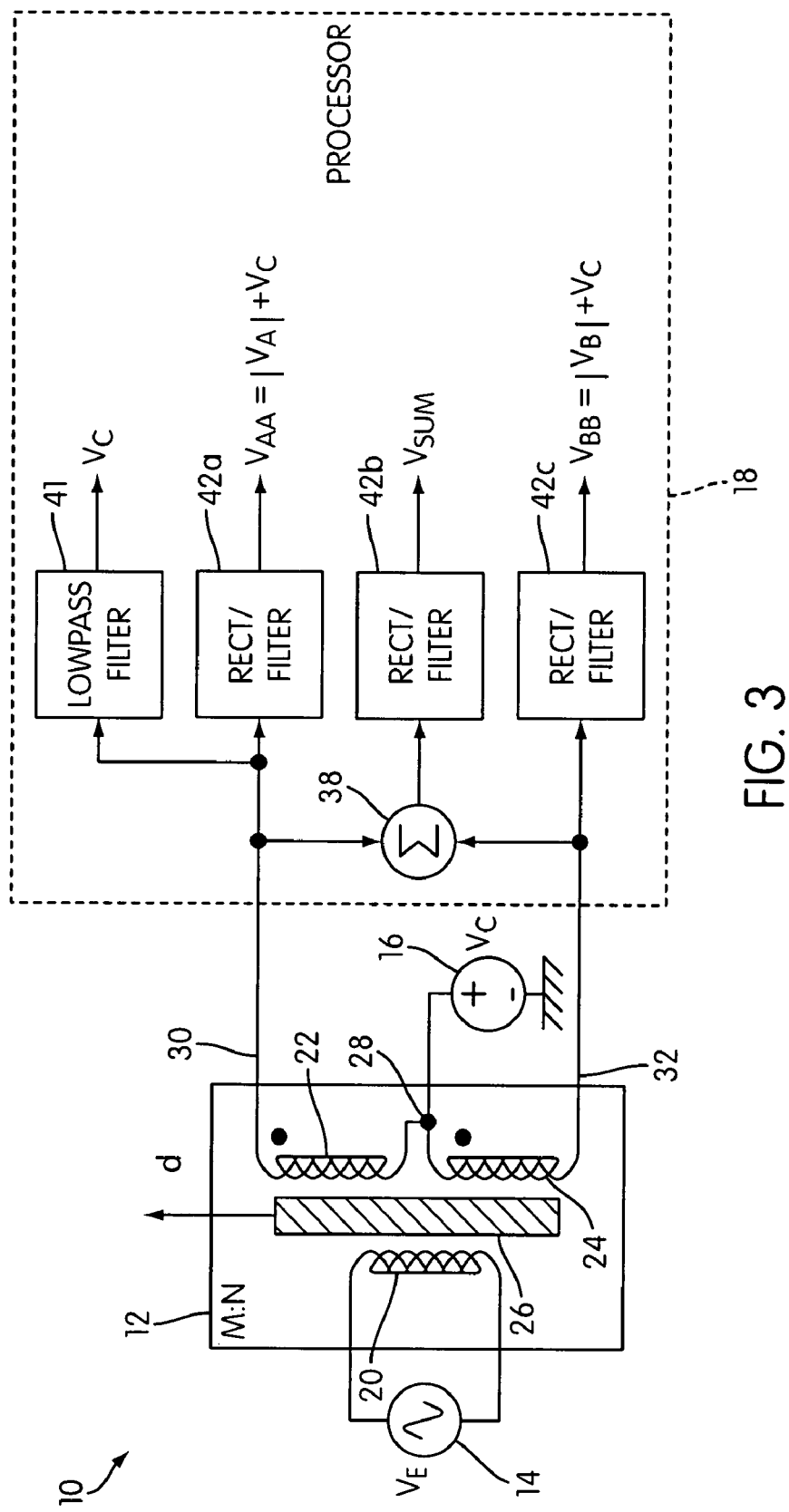
FIG. 3 is a schematic representation of a system for determining a position of a magnetic member, according to one embodiment of the invention.

In another embodiment, signals may be demodulated via demodulation circuits within processor 18. For example, FIG. 3 illustrates an embodiment of system 10 in which rectifier circuits 42 (illustrated as rectifier circuits 42a-42c) may be used to demodulate potentials to generate demodulated potentials. The demodulated potentials are then be processed further within processor 18 to determine the position of magnetic member 26 and/or detect connectivity faults within transformer 12.

In the embodiment of FIG. 3, processor 18 includes adder circuit 38, but not differencing circuit 40. In this embodiment, the difference potential $V_{DIFF}$ is determined by subtracting potential $V_{BB}$ from potential $V_{AA}$. In this configuration, not all connectivity faults at or around junction 28 are detectable by processor 18. Specifically, while open connections around junction 28 are readily detectable in this configuration, a short between secondary coils 22 and 24 is not. However, FIG. 4 illustrates an embodiment of system 10 in which this inability to readily detect a short between secondary coils 22 and 24 is avoided.

Figure 4:
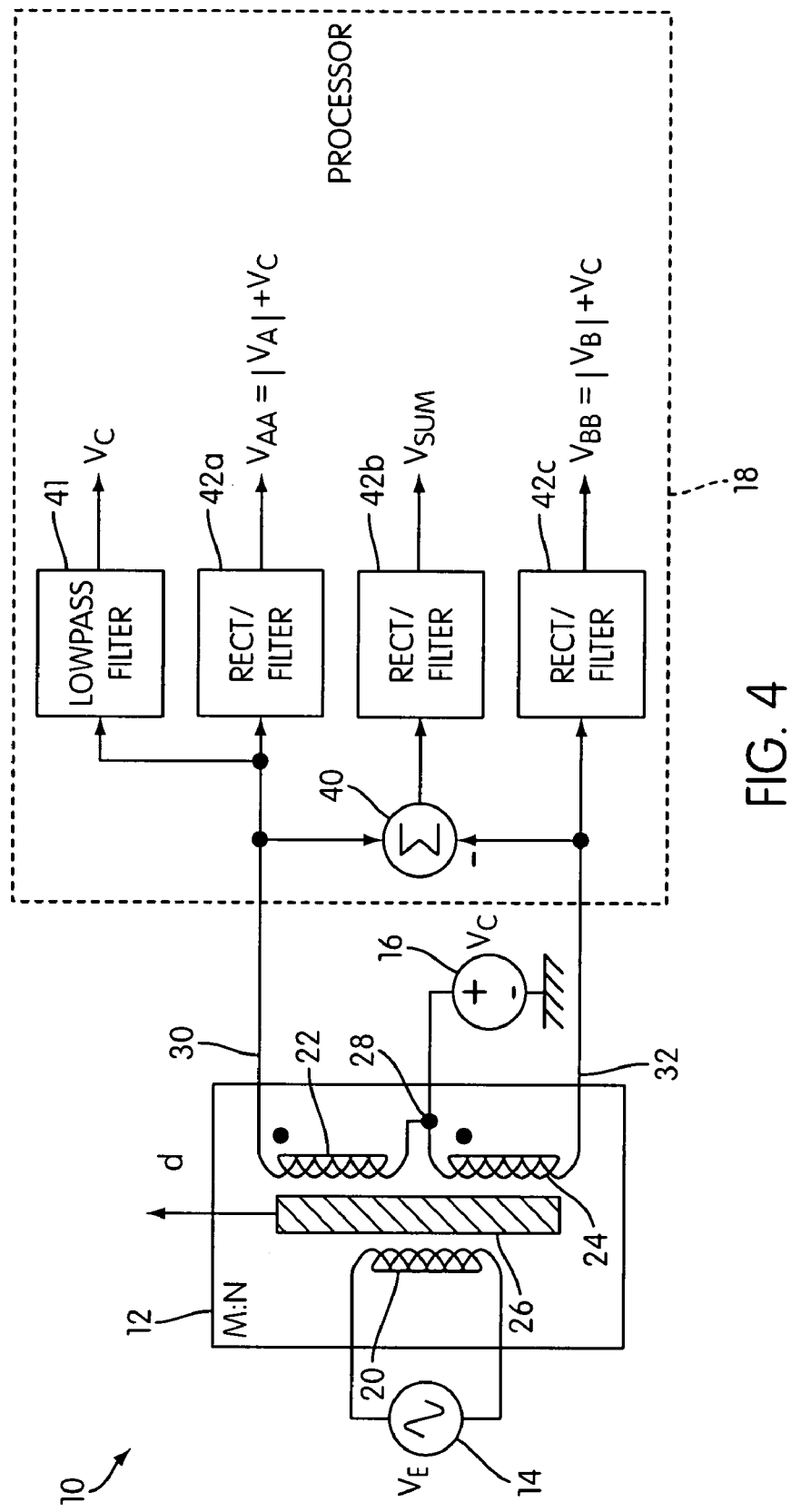
FIG. 4 is a schematic representation of a system for determining a position of a magnetic member, in accordance with one embodiment of the invention.

In the embodiment illustrated in FIG. 4, processor 18 includes differencing circuit 40, and secondary coils 22 and 24 are wound in opposite directions so that the induced potentials $V_A$ and $V_B$ be 180° out of phase. Because of the phase shift between induced potentials $V_A$ and $V_B$, the potential yielded by differencing circuit 40 will be the sum potential $V_{SUM}$, making the potentials used for further processing within processor 18 the same in the embodiments of both FIGS. 3 and 4. But, in the event of a short between secondary coils 22 and 24, induced potentials $V_A$ and $V_B$ will destructively interfere, thereby simplifying detection of the short by processor 18.

In the embodiments of both FIGS. 3 and 4, the bias potential $V_C$ is extracted from one of the output potentials $V_{AA}$ and $V_{BB}$ via a low pass filter 41. Low pass filter 41 extracts the DC component of the output potential, the DC component being, essentially, the bias potential $V_C$. The extracted bias potential $V_C$ is then used within processor 18 in further processing, such as, determining the position of magnetic member 26 and detecting connectivity faults within transformer 12.

Figure 5:
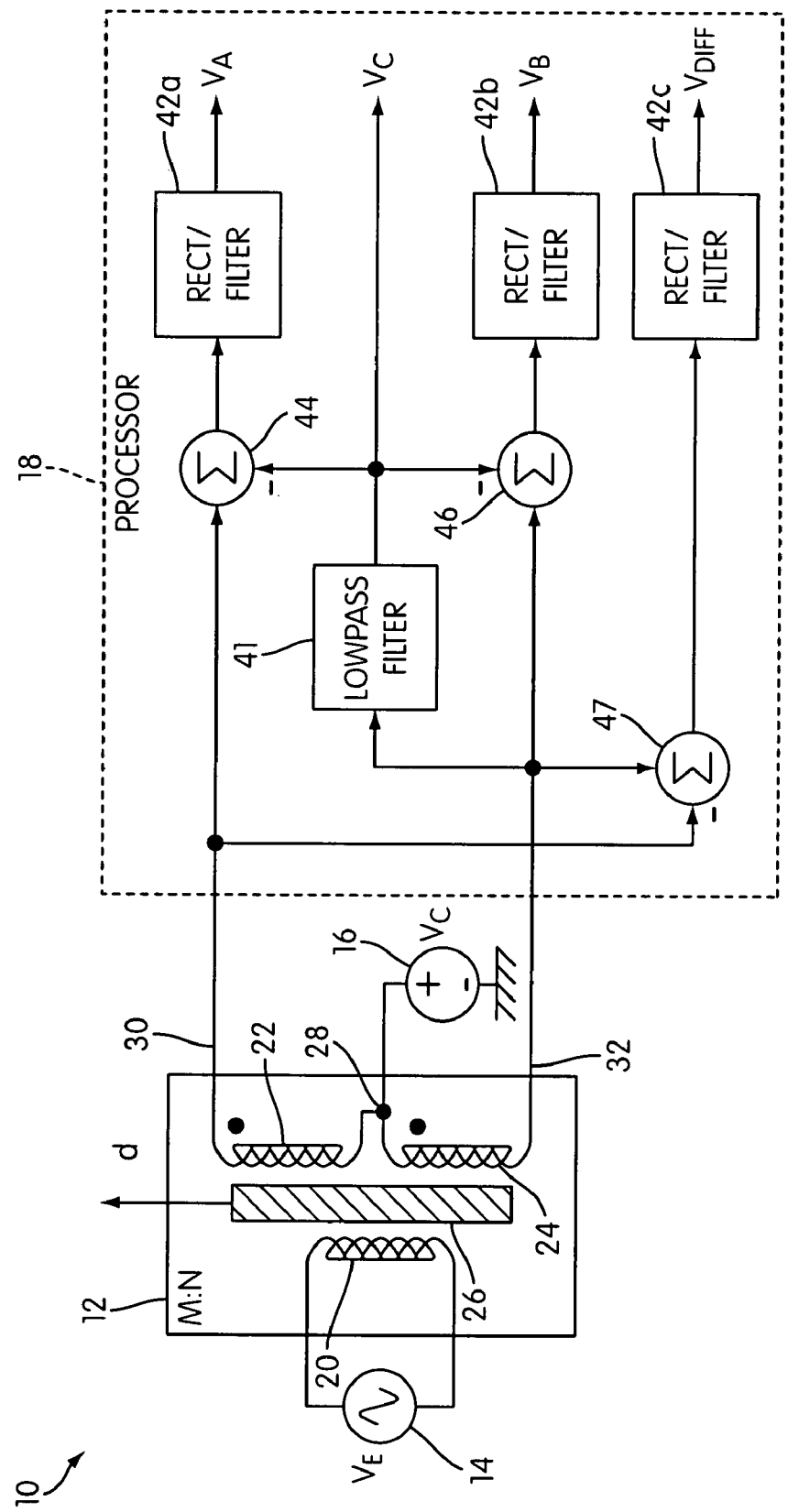
FIG. 5 is a schematic representation of a system for determining a position of a magnetic member, according to one embodiment of the invention.

FIG. 5 illustrates another configuration of system 10, according to one embodiment of the invention. In the embodiment shown in FIG. 5, the bias potential is extracted from one of the output signals and is then subtracted from each of the output potentials $V_{AA}$ and $V_{BB}$ by a pair of differencing circuits 44 and 46, to yield the induced potentials $V_A$ and $V_B$, prior to demodulation by rectifier circuits 42. A differencing circuit 47 subtracts output potential $V_{AA}$ from $V_{BB}$ to yield a detection potential $V_{DIFF}$ that is independent from the position of the magnetic member 26. As long as system 10 is configured such that the output potentials $V_{AA}$ and $V_{BB}$ are 180 degrees out of phase with each other, the amplitude of $V_{DIFF}$ remains constant in the absence of connectivity faults within transformer 12, as is illustrated by the following equation:

$$V_{DIFF}(t) = [Kd \cos(\omega t)] - [K(1-d)\cos(\omega t - \pi)]. \quad (14)$$

Incidentally, in other embodiments, system 10 may be configured such that the output potentials $V_{AA}$ and $V_{BB}$ are in phase with each other, and the following relationship is leveraged to provide $V_{DIFF}$ with a constant amplitude in the absence of connectivity faults.

$$V_{DIFF}(t) = [Kd \cos(\omega t)] + [K(1-d)\cos(\omega t)] \quad (15)$$

In the embodiment illustrated in FIG. 5, both $V_C$ and $V_{DIFF}$ are monitored within processor 18 for changes that signify a connectivity fault in transformer 12.

Figure 6:
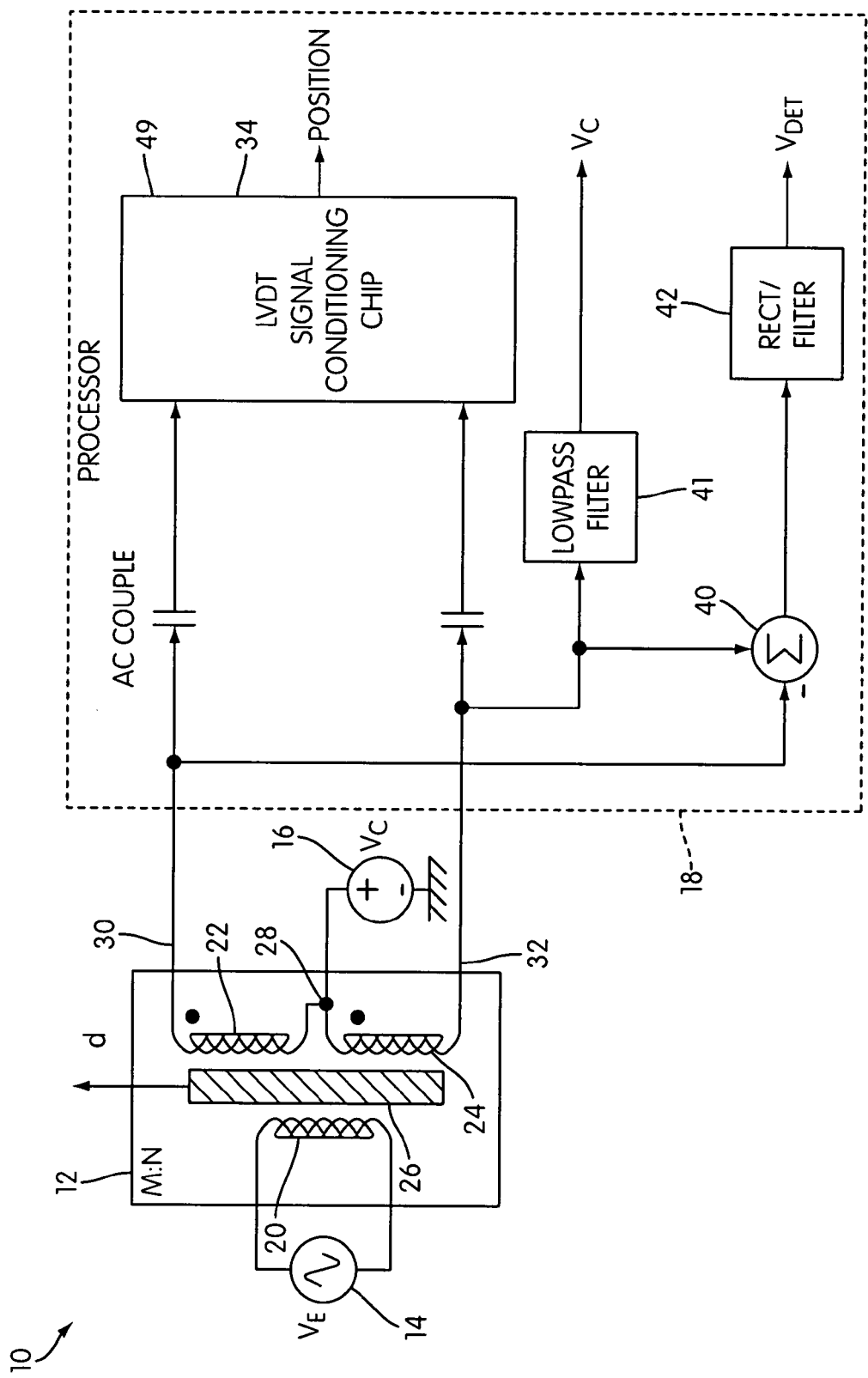
FIG. 6 is a schematic representation of a system for determining a position of a magnetic member, in accordance with one embodiment of the invention.

Referring to FIG. 6, system 10 is shown according to one embodiment of the invention, in which system 10 is wired the substantially the same as in the configuration shown in FIG. 5. The difference being that processor 18 includes a commercial off-the-shelf LVDT/RVDT signal conditioning chip 49, such as the Analog Devices AD598 (patent pending) that performs as position determination module 34 to determine the position of magnetic member 26. The output signals are AC coupled into the signal conditioning chip to remove the bias potential $V_C$. The signal conditioning chip can then compute position as if no bias were present in system 10. Two additional potentials are produced in this configuration, the bias potential $V_C$, which is extracted from one of the output potentials as was done in the configuration of FIG. 5, and $V_{DET}$ which corresponds to the detection potential $V_{DET}$ of the configuration of FIG. 5 discussed above. As was described previously, both $V_{BIAS}$ and $V_{DET}$ can be expected to remain constant independent from the position of magnetic member 26, and are monitored to ensure proper operation of transformer 12. In another embodiment similar to that of FIG. 6, differencing circuit 40 shown in FIG. 6 may be replaced with an adder circuit that would produce $V_{DET}$, provided the phasing of transformer 12 was arranged properly.

Figure 7:
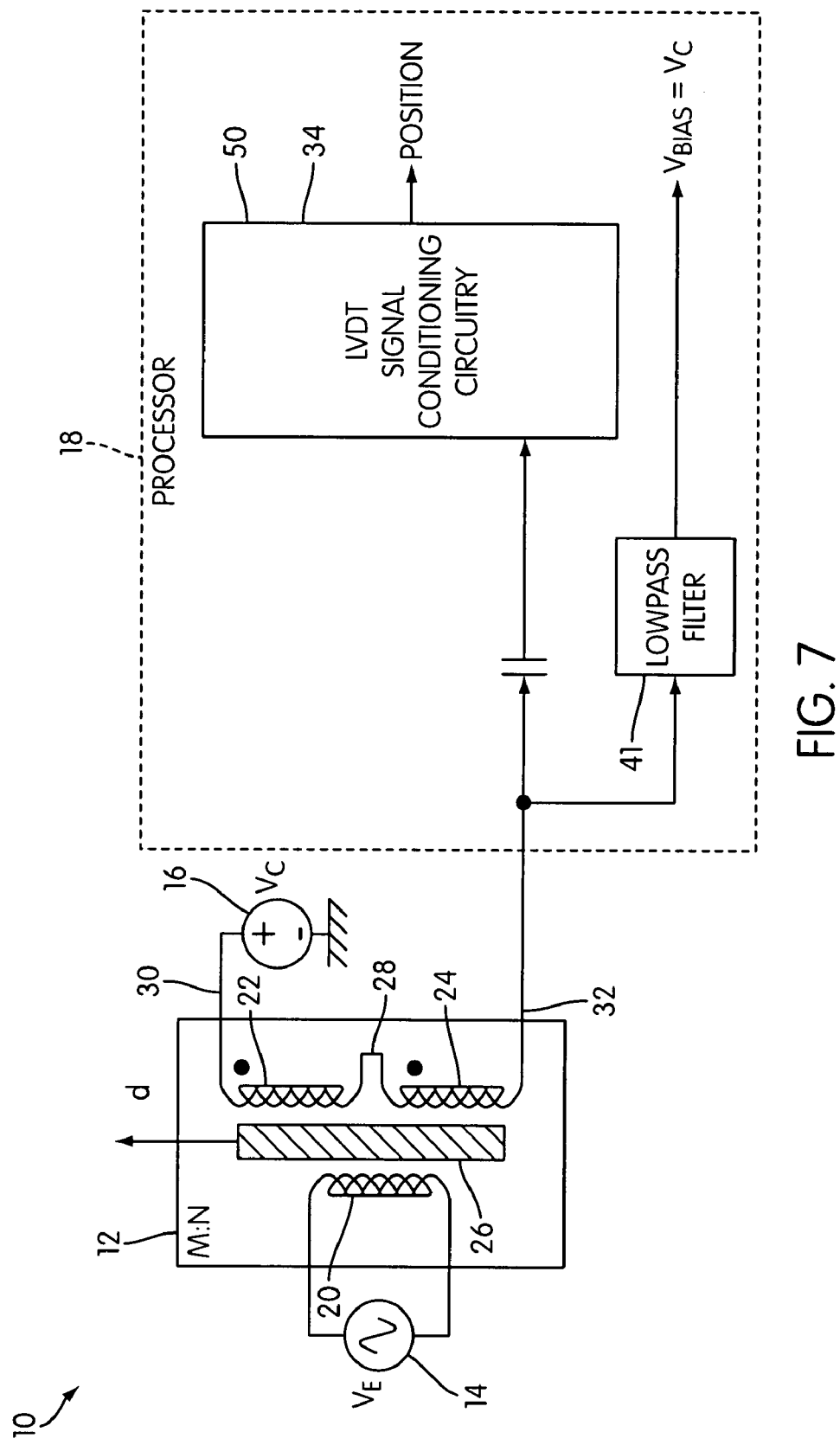
FIG. 7 is a schematic representation of a system for determining a position of a magnetic member, according to one embodiment of the invention.

The embodiments illustrated in FIGS. 1-6 have included 5-wire transformers. It may be appreciated that the present invention also contemplates applying a bias potential $V_C$ to other position detecting transformers. For example, FIG. 7 illustrates an embodiment of system 10 including a 4-wire linear variable differential transformer 48 in place of the 5-wire transformer 12. Within transformer 48, components similar to those included in transformer 12 are given the same reference numbers. The most notable difference between transformer 48 and transformer 12 is that in transformer 48 junction 28 is electrically coupled to each of first secondary coil 22 and second secondary coil 24, but junction 28 is not coupled to a potential sink (e.g., ground) or a potential source (e.g., bias potential source 16). Within system 10, bias potential source 16 is connected to transformer 48 at first lead 30 to apply the bias potential $V_C$ to transformer 48. The output at second lead 32, therefore, includes the bias potential $V_C$, as well as the induced potentials $V_A$ and $V_B$. The bias potential $V_C$ is extracted from the output signal on second lead 32, and this potential is then monitored by processor 18 to detect connectivity faults within transformer 48. In the embodiment shown in FIG. 7, position determining module 34 includes a signal conditioning chip 50 applying a conventional demodulation scheme, which may be similar to chip 49 described above. The output signal present on second lead 32 is AC coupled into chip 50 to remove the bias potential $V_C$ from the output signal.

Figure 8:
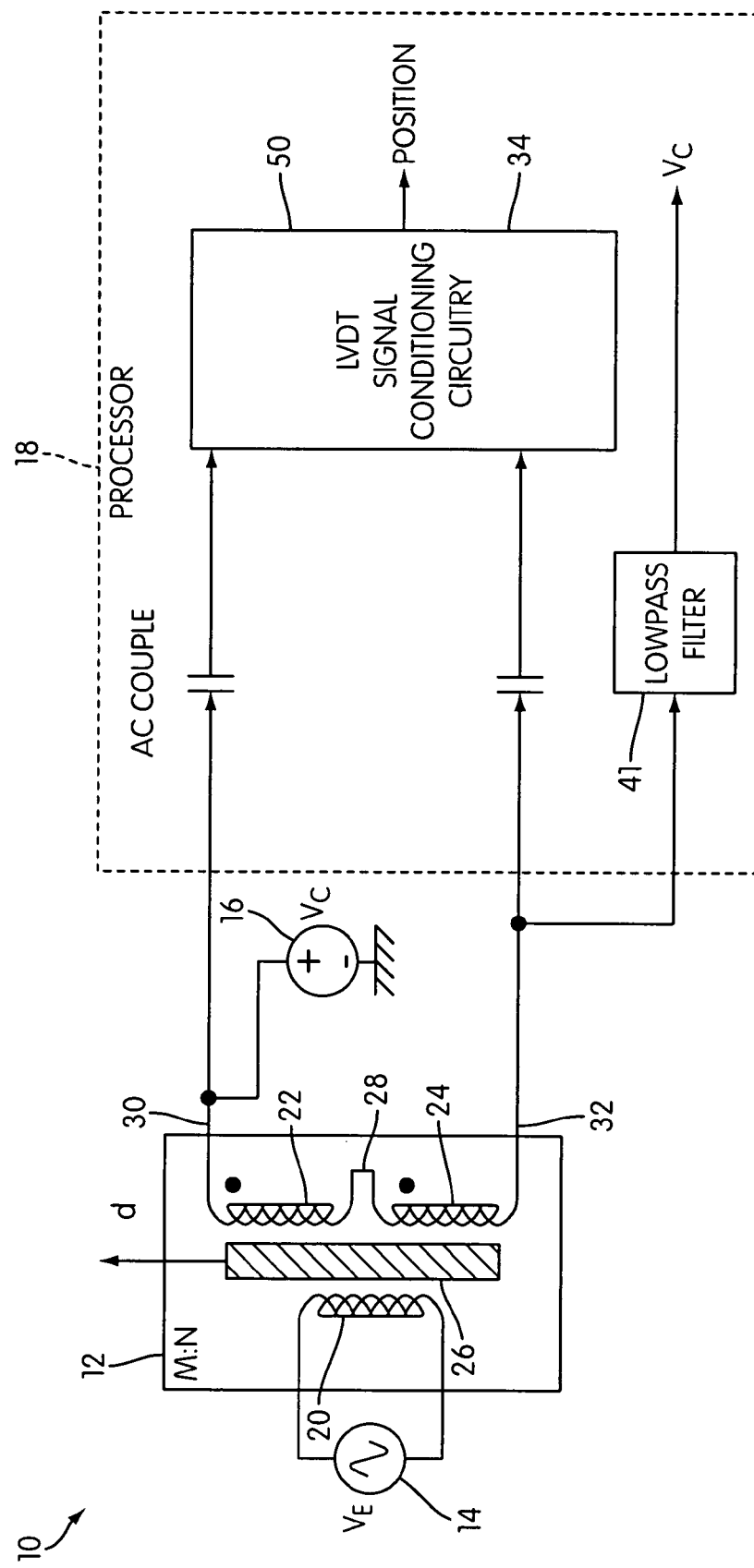
FIG. 8 is a schematic representation of a system for determining a position of a magnetic member, in accordance with one embodiment of the invention.

FIG. 8 illustrates another configuration of system 10 including transformer 48, according to one embodiment of the invention. In the configuration shown in FIG. 8, bias potential source 16 is again applied to transformer 48 on first lead 30, but unlike the configuration shown in FIG. 7, output signals on both first lead 30 and second lead 32 are AC coupled into chip 50 for enhanced noise immunity.

Figure 9:
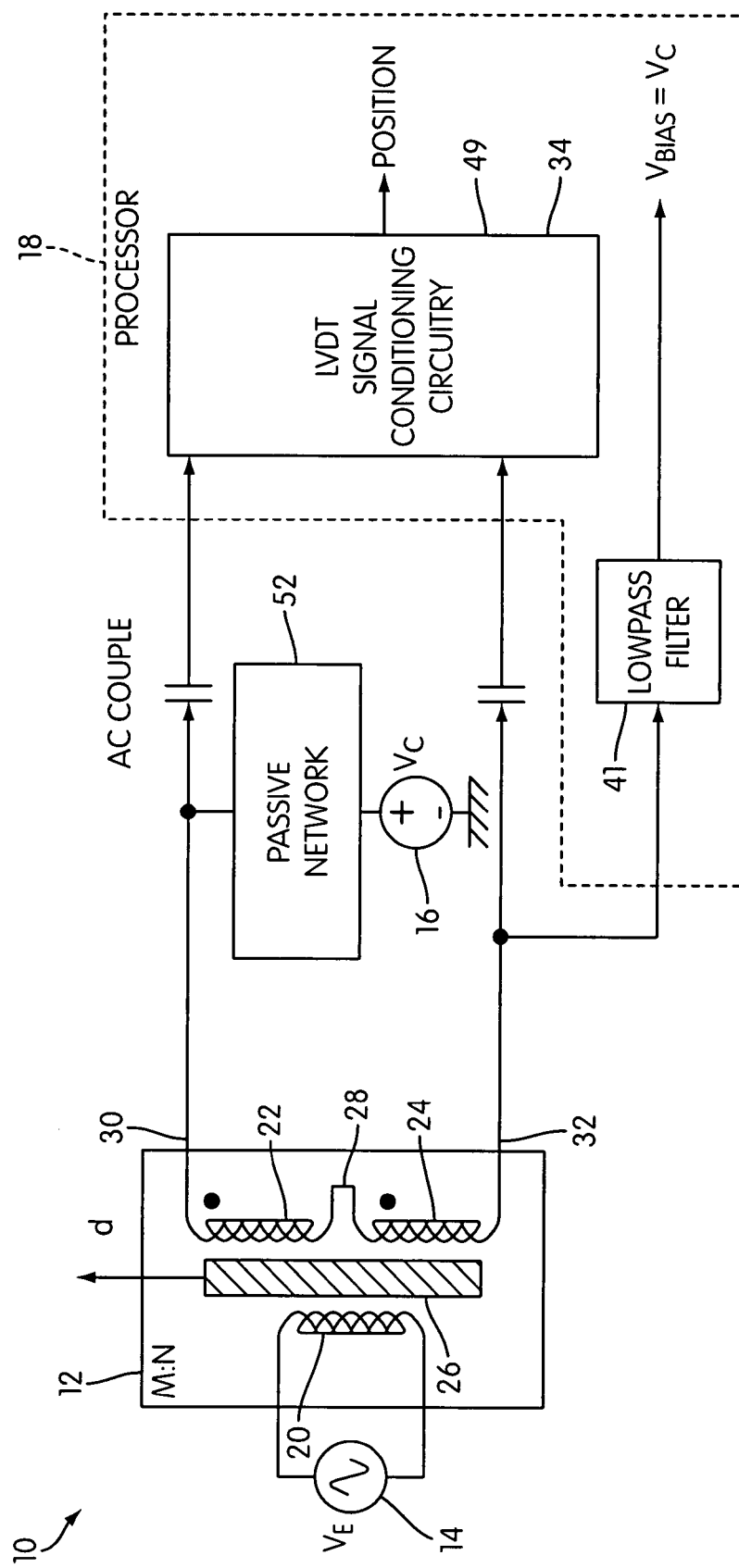
FIG. 9 is a schematic representation of a system for determining a position of a magnetic member, according to one embodiment of the invention.

FIG. 9 illustrates a configuration of system 10 according to another embodiment of the invention. The configuration of system 10 is similar to the configuration of FIG. 8, but includes a passive network 52 that couples the bias potential $V_C$ onto first lead 30 from bias potential source 16. Passive network 52 is an electronic network that has a low impedance at DC and a high impedance at the excitation frequency of excitation potential source 14.

Although the embodiments of the invention discussed above are described including linear variable differential transformers, it should be appreciated that this is for illustrative purposes only, and that the invention contemplates implementing a bias potential to detect connectivity faults in other types of transformers capable of determining a position of a member within the transformer. For example, the invention contemplates rotational variable differential transformers, synchros, and resolvers. Additionally, the descriptions of the embodiments above have disclosed the bias potential $V_C$ as a DC potential, however, in another embodiment of the invention the bias potential $V_C$ is an AC potential.

It can thus be appreciated that embodiments of the present invention have now been fully and effectively accomplished. The foregoing embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A system for detecting position that is capable of self-monitoring for connectivity faults, the system comprising:
    a transformer in which a magnetic member is movably disposed;
    an excitation potential source coupled to the transformer to apply an excitation potential to the transformer, wherein the application of the excitation potential to the transformer induces at least one induced potential that is dependent on the position of the magnetic member within the transformer;
    a bias potential source coupled to the transformer to apply a bias potential to the transformer; and
    a processor that is coupled to the transformer to receive at least one output signal, the at least one output signal including the at least one induced potential,
    the processor determining the position of the magnetic member based on the at least one induced potential, and
    the processor detecting connectivity faults within the transformer based on the presence or absence of the bias potential in the output signal.

2. The system of claim 1, wherein the transformer comprises:
    a primary coil that is coupled to the excitation potential source such that the excitation potential is applied to the primary coil;
    a first secondary coil that is positioned proximate to the primary coil such that the application of the excitation potential to the primary coil induces a first induced potential in the first secondary coil;
    a second secondary coil that is positioned proximate to the primary coil such that the application of the excitation potential to the primary coil induces a second induced potential in the second secondary coil; and
    a junction that is coupled to each of the first secondary coil and the second secondary coil,
    wherein the bias potential source is coupled to the junction and applies the bias potential to the junction.

3. The system of claim 1, wherein the transformer comprises:
    a primary coil that is coupled to the excitation potential source such that the excitation potential is applied to the primary coil;
    a first secondary coil that is positioned proximate to the primary coil such that the application of the excitation potential to the primary coil induces a first induced potential in the first secondary coil;
    a second secondary coil that is positioned proximate to the primary coil such that the application of the excitation potential to the primary coil induces a second induced potential in the second secondary coil;
    a first lead coupled to the first secondary coil; and
    a second lead that is coupled to the second secondary coil,
    wherein the bias potential source is coupled to one of the first lead or the second lead such that the bias potential is applied to the first lead or the second lead.

4. The system of claim 1, wherein the processor determines a rotational orientation of the magnetic member.

5. The system of claim 1, wherein the processor determines a linear displacement of the magnetic member.

6. The system of claim 1, wherein the excitation potential is an AC potential and the bias potential is a DC potential.

7. The system of claim 1, wherein the excitation potential and the bias potential are AC potentials.

8. The system of claim 1, wherein the transformer comprises a synchro.

9. The system of claim 1, wherein the transformer comprises a resolver.

10. The system of claim 1, wherein the transformer comprises a linear variable differential transformer.

11. The system of claim 1, wherein the transformer comprises a rotational variable differential transformer.

12. The system of claim 1, wherein the transformer comprises a 5-wire transformer.

13. The system of claim 1, wherein the transformer comprises a 4-wire transformer.

* * * * *